(12) United States Patent
Yamamoto et al.

(10) Patent No.: US 6,399,683 B1
(45) Date of Patent: *Jun. 4, 2002

(54) RESIN COMPOSITION FOR EXTRUDED FORMS

(75) Inventors: Koji Yamamoto; Hajime Ikeno; Keiko Shichijo, all of Yokkaichi (JP)

(73) Assignee: Mitsubishi Chemical Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/967,103

(22) Filed: Nov. 10, 1997

Related U.S. Application Data

(63) Continuation of application No. 08/393,033, filed on Feb. 23, 1995, now abandoned, which is a continuation of application No. 08/159,247, filed on Nov. 30, 1993, now abandoned.

(30) Foreign Application Priority Data

Dec. 7, 1992 (JP) .............................. 4-327015
Feb. 17, 1993 (JP) .............................. 5-027892

(51) Int. Cl.$^7$ .................. C08L 23/08; C08K 5/13; C08K 5/20; C08K 5/526
(52) U.S. Cl. .................. 524/115; 524/128; 524/232; 524/323; 525/53; 525/240; 525/320; 525/324
(58) Field of Search .................. 525/240, 53, 320, 525/324; 524/115, 128, 323, 232

(56) References Cited

U.S. PATENT DOCUMENTS

| | | | | |
|---|---|---|---|---|
| 4,339,507 A | * | 7/1982 | Kurtz et al. .................. | 525/240 |
| 5,120,696 A | * | 6/1992 | Tsutsui et al. .................. | 526/116 |
| 5,189,106 A | * | 2/1993 | Mommoto et al. .................. | 525/240 |
| 5,206,075 A | * | 4/1993 | Hodgson, Jr. .................. | 525/240 |
| 5,260,384 A | * | 11/1993 | Mommoto et al. .................. | 525/240 |
| 5,272,236 A | * | 12/1993 | Lai et al. .................. | 526/348.5 |
| 5,278,272 A | * | 1/1994 | Lai et al. .................. | 526/348.5 |
| 5,376,439 A | * | 12/1994 | Hodgson et al. .................. | 525/240 |
| 5,378,764 A | * | 1/1995 | Benham et al. .................. | 525/240 |
| 5,382,631 A | * | 1/1995 | Sterling et al. .................. | 525/240 |
| 5,741,861 A | * | 4/1998 | Yamamoto et al. .................. | 528/240 |
| 5,863,665 A | * | 1/1999 | Kale et al. .................. | 525/240 |
| 5,904,964 A | * | 5/1999 | Snyder .................. | 525/240 |

FOREIGN PATENT DOCUMENTS

EP    0 359 440    3/1990

OTHER PUBLICATIONS

L.W. Pebsworth, "Low Density Polyethylene", Kirk–Othmer's Encylopediat of Chemical Technology, vol. 17, pp. 712–713 (1995).*

Speed, et al., "Structure/Property Relationships in EXXPOL(TM) Polymers", Soc. of Plastics Engs., Polyolefins VIII International Conference, Feb. 24–27, 1991, Houston, TX.*

* cited by examiner

Primary Examiner—D. R. Wilson
(74) Attorney, Agent, or Firm—Oblon, Spivak, McClelland, Maier & Neustadt, P.C.

(57) ABSTRACT

A resin composition for extruded forms that has improved workability, and excellent properties with respect to transparency, heat resistance, low-temperature resistance, etc. The composition contains 50 to 99% by weight of component A, which is a copolymer of ethylene and α-olefin, and 1 to 50% by weight of component B, which is an ethylene-containing polymer. The component A has: (a) a melt flow rate (MFR) of 0.1 to 5 g/10 min.; (b) a density D of 0.88 to 0.925 g/cm$^3$; (c) a single peak of elution volume indicated by an elution curve obtained by temperature rising elution fractionation (TREF), the peak corresponding to a temperature within a range of from 30 to 100®, and the elution curve satisfying a relationship in which the ratio H/W is not less than 1 when H represents the height of the peak and W represents the width of the elution curve at half of the height H; and (d) an elution volume Y (in % of the weight thereof with respect to the total weight of the component A) at an elution temperature of 50C in TREF, the elution volume Y satisfying the following condition: ① $Y \leq -4500D+4105$ when the density D of the component A is less than 0.91 g/cm$^3$, but $Y \leq 100$; or ② $Y \leq 10$ when the density D of the component A is not less than 0.91 g/cm$^3$. The component B has: (a') a melt flow rate of 0.1 to 20 g/10 min.; (b') a density of 0.88 to 0.93 g/cm$^3$; (c') a memory effect (ME) of not less than 1.3; and (d') a melt tension (MT) of not less than 1.0 g.

21 Claims, No Drawings

RESIN COMPOSITION FOR EXTRUDED FORMS

This application is a Continuation of Ser. No. 08/393,033, filed Feb. 23, 1995, now abandoned, which was a continuation of Ser. No. 08/159,247, filed Nov.30, 1993, now abandoned.

BACKGROUND OF THE INVENTION

1. Field of the Invention

The present invention relates to a resin composition for extruded forms that has improved workability, and excellent properties with respect to transparency, heat resistance, low-temperature resistance, impact strength, heat sealability, food sanitation, etc., and that may particularly be advantageously used for the formation of extruded forms such as films or sheets.

2. Description of the Related Art

Hitherto, a polypropylene resin has been known as a material for forming extruded forms, such as films and sheets, which are transparent. Since a film formed of a polypropylene (hereinafter abbreviated as "PP") resin also has good rigidity, etc., a PP film is widely used as a wrapping/packaging material for various applications. However, the range of fields to which a PP film can be applied is limited by the fact that the film is unsuitable for forming by a general working technique, such as air-cooled inflation forming, and that the film has poor properties with respect to impact strength, low-temperature resistance and low-temperature heat sealability.

In view of these problems, a high-pressure low-density polyethylene (hereinafter abbreviated as "LDPE"), which is a resin capable of compensating for the problems of PP resin, has become widely used for the production of a general-use film. However, though LDPE is effective for the compensation of the problems of PP, LDPE has poorer transparency than PP.

A copolymer of ethylene and α-olefin obtained by using a Ziegler catalyst in a method described, e.g., in Japanese Patent Publication No. 56-18132, is known as a linear low-density polyethylene (hereinafter abbreviated as "LLDPE"). LLDPE is a resin having better properties than an LDPE resin, described above, with respect to impact strength, heat sealability, hot tack, heat resistance, low-temperature resistance, etc. It is known that the transparency of LLDPE can be improved by subjecting it to special working by a certain technique, such as known T-die forming, water-cooled inflation forming, or air-cooled inflation forming using a special air ring.

However, when the surface of an LLDPE film is smoothed to produce a film having good transparency, the LLDPE has its low-crystallinity components bled out to the surface of the film (this phenomenon is referred to as bleedout). As a result, the anti-blocking property of the film is greatly impaired, making actual use of the film difficult.

In order to overcome these problems, a method of adding an anti-blocking agent or slip agent, such as silica or talc, to LLDPE has been adopted. However, the addition of such an anti-blocking agent involves scattering of light, resulting in impaired transparency. Thus, it has been difficult to improve the transparency of the LLDPE resin itself.

Recently, it has become possible to obtain LLDPE having a chemical composition variation range more limited than more conventional LLDPE by using a novel catalyst described in Japanese Patent Laid-Open No. 58-19309, etc.

Hence, it has become possible for LLDPE to have better transparency and anti-blocking property than a more conventional LLDPE. However, the range of molecular-weight distribution is also narrowed, thereby greatly deteriorating workability.

Further, although such a conventional LLDPE has better heat resistance and low-temperature resistance than a pp or a low-density polyethylene, the conventional LLDPE has not been quite applicable to uses such as containers for pharmaceutical products or containers for cryogenic preservation, which containers must be transparent enough to be able to preserve contents in their readily visible state or must be free from breakage when at sterilized high-temperature and used for freeze-preservation at a temperature of –50℃ or lower, and more recently, at a temperature of –80℃ or lower.

SUMMARY OF THE INVENTION

An object of the present invention is to provide a resin composition for forming extruded forms, in particular, films or sheets, that has good workability, and also has greatly improved properties with respect to transparency, heat resistance, low-temperature resistance, etc.

The present inventors have made various studies to obtain means for achieving a well-balanced material that has improved workability and that also assures excellent properties, finding that the object of the present invention can be achieved by blending together an LDPE having specific properties and an LLDPE having specific properties. The present invention has been formulated on the basis of the above knowledge.

A resin composition for extruded forms according to the present invention is characterized in that the resin composition contains component A and component B specified as follows:

Component A:

Component A is a copolymer of ethylene and olefin having a carbon number of 4 to 40, the component A being contained in the resin composition in an amount of 50 to 99% by weight, and having the following properties (a) to (d):

(a) a melt flow rate (MFR) of 0.1 to 5 g/10 min.;

(b) a density D of 0.88 to 0.925 g/cm$^3$;

(c) an elution curve having a single peak of elution volume, as indicated by an elution curve obtained by temperature rising elution fractionation (TREF), said the peak corresponding to a temperature within a range from 30 to 100℃, and the elution curve satisfying a relationship in which the ratio H/W is not less than 1 when H represents the height of the peak and W represents the width of the elution curve at half of the height H; and (d) an elution volume Y (in % of the weight thereof with respect to the total weight of the component A) at an elution temperature of 50℃ in temperature rising elution fractionation, said elution volume Y satisfying the following condition ① or ②:

① $Y \leq -4500D+4105$ when the density D of the component A is less than 0.91 g/cm$^3$, but $Y \leq 100$; or ② $Y \leq 10$ when the density D of the component A is not less than 0.91 g/cm$^3$.

Component B:

Component B is an ethylene-containing polymer, the component B being contained in the resin composition in an amount of 1 to 50% by weight, and having the following properties (a') to (d'):

(a') a melt flow rate of 0.1 to 20 g/10 min.;
(b') a density of 0.88 to 0.93 g/cm$^3$;
(c') a memory effect (ME) of not less than 1.3; and
(d') a melt tension (MT) of not less than 1.0 g.

DETAILED DESCRIPTION OF THE INVENTION

[I] Components (1) Componenet A (Copolymer of Ethylene and α-Olefin Having 4 to 40 Carbons)

(a) Properties of Component A

It is important that a copolymer of ethylene and α-olefin having 4 to 40 carbons (such olefin will be referred to as "C$_4$ to C$_{40}$ α-olefin" unless otherwise specified) contained as component A in a resin composition for extruded forms according to the present invention have the following properties ① to ④, preferably ① to ⑤:

① Melt Flow Rate

The copolymer of ethylene and C$_4$ to C$_{40}$ α-olefin used in the present invention should have a melt flow rate (MFR) within a range of from 0.1 to 5 g/10 min. as measured in accordance with Japanese Industrial Standards (JIS) K7210, preferably from 0.3 to 4 g/10 min., and more preferably from 0.7 to 3.5 g/10 min.

If the melt flow rate of the copolymer exceeds the upper limit of the range of from 0.1 to 5 g/10 min., heat resistance and low-temperature resistance may be impaired, and film formation may become unstable. A melt flow rate less than the lower limit of this range is not practical because resin pressure may become so great as to impair formability or reduce producibility.

② Density

The copolymer of ethylene and C$_4$ to C$_{40}$ α-olefin used in the present invention should have a density D within a range of from 0.88 to 0.925 g/cm$^3$ as measured in accordance with JIS K7112, preferably from 0.89 to 0.92 g/cm$^3$, and more preferably from 0.90 to 0.915 g/cm$^3$.

If the density of the copolymer exceeds 0.925 g/cm$^3$, transparency and heat sealability may be impaired. If the copolymer has too small a density, heat resistance may be impaired or blocking may occur on the surface of a formed film, thereby rendering the film unusable.

③ Temperature at the Peak of Elution Curve Obtained by Temperature Rising Elution Fractionation The copolymer of ethylene and C$_4$ to C$_{40}$ α-olefin used in the present invention should have a single peak elution curve as obtained by temperature rising elution fractionation (TREF). The peak should correspond to a temperature within a range of from 30 to 100®, preferably from 35 to 85®, and more preferably from 40 to 70®. The elution curve should satisfy a relationship in which the ratio H/W of the height H of the peak with respect to the width W of the elution curve at half of the height H is not less than 1, preferably within a range of from 1 to 20, more preferably from 1 to 15, and most preferably from 1 to 10.

If the peak of the elution curve corresponds to a temperature exceeding 100®, a formed product may have poor transparency and poor low-temperature heat sealability, thereby becoming unusable. If the peak of the elution curve corresponds to a temperature less than 30®, a formed product may suffer from bleedout, and a film may suffer from blocking, thereby becoming unusable.

If the ratio H/W is less than 1, a formed product may suffer from bleedout. In addition, the copolymer may contain a not negligible amount of components that cause blocking, and a film may have impaired heat sealability after the passage of a long time, thereby becoming unusable.

④ Elution Volume at Elution Temperature of 50® in Temperature Rising Elution Fractionation The copolymer of ethylene and C$_4$ to C$_{40}$ α-olefin used in the present invention should have a specific elution volume Y (in % of the weight thereof with respect to the total weight of the component A) at an elution temperature of 50® in temperature rising elution fractionation, the elution volume Y satisfying the following condition 1) or 2):

1) Y≦−4500D+4105, preferably Y≦−4650D +4238, when the density D of the component A is less than 0.91 g/cm$^3$, but Y≦100; or
2) Y≦10, preferably Y≦7, when the density D of the component A is not less than 0.91 g/cm$^3$.

Obtaining Elution Curve by Temperature Rising Elution Fractionation

The elution volume of the copolymer is measured by temperature rising elution fractionation (TREF) performed in the following manner on the basis of the principles described in, for example, "Journal of Applied Polymer Science" (Vol. 26, pages 4217 to 4231, 1981) or "Drafts for Symposium on Polymer" (2P1C09, 1985).

In principle, TREF of a polymer is performed as follows: a polymer to be measured is completely dissolved in a solvent. Thereafter, the resulting solution is cooled, so that a thin polymer layer is formed on the surface of an inactive carrier. In the polymer layer, those components of the polymer which crystallize easily are on the inner side (the side of the layer close to the surface of the inactive carrier) while components which do not crystallize easily are on the outer side.

When temperature is raised continuously or in a stepwise manner, elution occurs, starting with the non-crystalline components of the relevant polymer, that is, those short-chain branches of the polymer having relatively high degrees of branching, these polymer components being eluted in low-temperature stages. As the temperature increases, those portions having lower branching degrees are eluted gradually. Finally, the branchless straight-chain portion is eluted, thereby completing TREF.

The concentrations of fractions eluted at each temperature are detected, and each elution volume is plotted against elution temperatures to obtain an elution curve in a graphical representation. Such an elution curve enables the component distribution of the polymer to be determined.

⑤ Q Value

The copolymer of ethylene and C$_4$ to C$_{40}$ α-olefin used in the present invention should preferably have a specific Q value (the ratio Mw/Mn of the weight-average molecular weight Mw with respect to the number-average molecular weight Mn) obtained by size exclusion chromatography (SEC), the Q value being not more than 4, preferably not more than 3, and more preferably not more than 2.5.

If the Q value of the copolymer is greater than the above-specified value, the external appearance of a formed product tends to be impaired.

(b) Preparation of Copolymer of Ethylene and C$_4$ to C$_{40}$ α-Olefin

A copolymer of ethylene and C$_4$ to C$_{40}$ α-olefin used in the present invention may be prepared by copolymerizing the main component, ethylene, and the sub-component, α-olefin, by using a metallocene catalyst, in particular, a metallocene-alumoxane catalyst or a catalyst such as that disclosed, e.g., in International Patent Laid-Open No. WO92/01723, comprising a mixture of a metallocene compound and a compound, such as one described below capable of forming a stable anion by reacting with a metallocene compound. A preparation method disclosed, for example, in any of the following publications may be used: Japanese Patent Laid-Open Nos. 58-19309, 59-95292, 60-35005, 60-35006, 60-35007, 60-35008, 60-35009, 61-130314, and 3-163088; European Patent Laid-Open No. 420436; U.S. Pat. No. 5,055,438; and International Patent Laid-Open No. WO91/04257.

The above-stated compound capable of forming a stable anion by reacting with a metallocene compound is either an ionic compound having ion pairs of cations and anions, or an electrophilic compound. Such a compound forms a stable ion by reacting with a metallocene compound, thereby providing an active species for polymerization.

The above ionic compound is expressed by the following general formula (I):

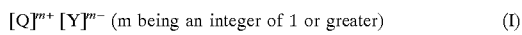

$$[Q]^{m+} [Y]^{n-} \text{ (m being an integer of 1 or greater)} \quad (I)$$

In the formula (I), Q represents a cation component of the ionic compound. The cation component may be, for example, carbonium cation, tropylium cation, ammonium cation, oxonium cation, sulfonium cation or phosphonium cation. Also, the cation component may be a metallic cation or an organometallic cation, which cation itself can be easily reduced.

The cation component may be a cation which can give away proton(s), as disclosed in Japanese Patent Publication No. 1-501950, or a cation which does not give away proton(s). Specific examples of cations of the second type include triphenylcarbonium, diphenylcarbonium, cycloheptatrienium, indenium, triethylammonium, tripropylammonium, tributylammonium, N,N-dimethylanilinium, dipropylammonium, dicyclohexylammonium, tripheylphosphonium, trimethylphosphonium, tri(dimethylphenyl)phosphonium, tri(methylphenyl)phosphonium, triphenylsulfonium, triphenyloxonium, triethyloxonium, pyrylium, silver ion, gold ion, platinum ion, palladium ion, mercury ion, and ferrocenium ion.

In the above formula (I), Y represents an anion component of the ionic compound which is transformed into a stable anion through reaction with a metallocene compound. The anion component may be, for example, organic boron compound anion, organic aluminum compound anion, organic gallium compound anion, organic phosphorus compound anion, organic arsenic compound anion or organic antimony compound anion. Specific examples of such anions include tetraphenyl boron, tetrakis(3,4,5-trifluorophenyl) boron, tetrakis(3,5-di(trifluoromethyl)phenyl) boron, tetrakis(3,5-(t-butyl)phenyl) boron, tetrakis(pentafluorophenyl) boron, tetraphenyl aluminum, tetrakis(3,4,5-trifluorophenyl) aluminum, tetrakis(3,5-di(trifluoromethyl)phenyl) aluminum, tetrakis(3,5-di(t-butyl)phenyl) aluminum, tetrakis(pentafluorophenyl) aluminum, tetraphenyl gallium, tetrakis(3,4,5-trifluorophenyl) gallium, tetrakis(3,5-di(trifluoromethyl) phenyl gallium, tetrakis(3,5-di(t-butyl) phenyl) gallium, tetrakis(pentafluorophenyl) gallium, tetraphenyl phosphorus, tetrakis(pentafluorophenyl) phosphorus, tetraphenyl arsenic, tetrakis(pentafluorophenyl) arsenic, tetraphenyl antimony, tetrakis(pentafluorophenyl) antimony, decaborate, undecaborate, carbadodecaborate, and decachlorodecaborate.

As stated above, an electrophilic compound may be used instead of an ionic compound, the electrophilic compound comprising a certain kind of Lewis acid capable of forming a stable anion by reacting with a metallocene compound so as to provide an active species for polymerization. The electrophilic compound may be, for example, a halogenated metal compound of varying type, or a metal oxide known as a solid acid. Specifically, halogenated magnesium, inorganic oxides of the Lewis-acid type, or the like may be used.

α-Olefin

α-olefin having a carbon number of 4 to 40, which serves as the sub-component of the copolymer, may comprise, for example, 1-butene, 1-pentene, 1-hexene, 1-octene, 1-heptene, 4-methylpentene-1, 4-methylhexene-1, 4,4-dimethylpentene-1, or octadecene. Among olefins having a carbon number of 4 to-40, those having a carbon number of 4 to 18 are preferable, those having a carbon number of 4 to 12 are more preferable, and those having a carbon number of 6 to 10 are most preferable. It is preferable that 2 to 60% by weight (percentages by weight will hereinafter be abbreviated to wt %), preferably 5 to 50 wt %, of one or more such olefins be copolymerized with 40 to 98 wt %, preferably 50 to 95 wt %, of ethylene.

Copolymerization of Ethylene and $C_4$ to $C_{40}$ α-Olefin

Methods which may be used to copolymerize ethylene and $C_4$ to $C_{40}$ α-olefin comprises, for example, gaseous phase methods, slurry methods, solution methods or high-pressure ion polymerization methods. Among these, solution methods and high-pressure ion polymerization methods are preferable, with preparation by high-pressure ion polymerization methods being particularly preferable.

The above-mentioned high-pressure ion polymerization method is a method for continuous production of an ethylene-based polymer, such as that disclosed, e.g., in Japanese Patent Laid-Open No. 56-18607 or 58-225106, and the method adopts reaction conditions comprising a pressure of not less than 200 kg/cm², preferably a pressure within a range of from 300 to 2000 kg/cm², and a temperature of not less than 125®, preferably a temperature within a range of from 130 to 250®, and more preferably from 150 to 200®.

(2) Component B (Ethylene-containing Polymer)

(a) Properties of Component B

It is important that the ethylene-containing polymer serving as component B of a resin composition for extruded forms according to the present invention have the following properties ① to ③, preferably ① to ⑥:

① Melt Flow Rate

The ethylene-containing polymer used in the present invention should have a melt flow rate (MFR) within a range from 0.1 to 20 g/10 min. as measured in accordance with Japanese Industrial Standards (JIS) K7210, preferably from 0.5 to 10 g/10 min., and more preferably from 1.0 to 5.0 g/10 min.

If the melt flow rate of the ethylene-containing polymer exceeds the upper limit of the range of from 0.1 to 20 g/10 min., formability may be impaired, making film formation unstable. If the melt flow rate is less than the lower limit of this range, extrudability as well as the external appearance of a formed product may be impaired or spoiled.

② Density

The ethylene-containing polymer used in the present invention should have a density within a range of from 0.88 to 0.93 g/cm³ as measured in accordance with JIS K7112, preferably from 0.915 to 0.93 g/cm³, more preferably from 0.918 to 0.927 g/cm³, and most preferably from 0.919 to 0.923 g/cm³.

If the density of the ethylene-containing polymer exceeds the upper limit of the range of from 0.88 to 0.93 g/cm³, transparency as well as low-temperature heat sealability may be impaired. If that density is smaller than the lower limit of this range, a formed product may suffer from bleedout, and a film may have a surface suffering from blocking.

③ Memory Effect (ME)

The ethylene-containing polymer used in the present invention should have a memory effect (3 grams) of not less than 1.3, preferably not less than 1.6, more preferably not less than 2.0, and most preferably not less than 2.3.

A memory effect lower than 1.3 is not preferable because this may cause unstable formability.

Memory effect (3 grams) is measured in the following manner by using a melt indexer such as that used in JIS K7210, and by setting measurement conditions comprising a cylinder temperature of 240®, and a constant rate extrusion amount of 3 g/min:

The desired sample is charged into the apparatus, and only the piston is placed on the sample. After 6 minutes have passed, the prescribed extrusion rate is applied. Then, a graduated cylinder containing ethyl alcohol is placed immediately below the orifice of the die, so that a straight extrudate can be collected.

The diameter $D_1$ of the collected extrudate is measured with a micrometer, and the memory effect ME of the sample is calculated by the following formula where the diameter of the orifice is represented as $D_0$:

$$ME = D_1/D_0$$

④ Q Value

The ethylene-containing polymer used in the present invention should preferably have a specific Q value (the ratio Mw/Mn of the weight-average molecular weight Mw with respect to the number-average molecular weight Mn) obtained by size exclusion chromatography (SEC), the Q value being within a range from 5 to 30, preferably from 7 to 25, and more preferably from 10 to 20.

If the Q value of the ethylene-containing polymer is greater than 30, the external appearance of a formed product tends to be impaired. Too small a Q value is not preferable either, because formability tends to be unstable.

⑤ Melt Tension (MT; Melt Tension at Fracture)

The ethylene-containing polymer used in the present invention should preferably have a melt tension of not less than 1.0 g, preferably not less than 1.5 g, more preferably not less than 2.5 g, and most preferably not less than 5 g. Too small a melt tension is not preferable because it causes unstable formability.

⑥ Interrelationship between ME and MT

The ethylene-containing polymer used in the present invention should preferably have the following interrelationship between ME and MT:

$$ME \geq [0.05 \times MT + 1.3]/g,$$

preferably $ME \geq [0.05 \times MT + 1.5]/g$

Satisfying the above interrelationship is effective for improving workability during forming.

(b) Specific Examples of Ethylene-containing Polymer Which May Be Used

An ethylene-containing polymer to be used may be suitably selected from among substances such as polyethylene, ethylene-α-olefin copolymer different from component A, ethylene-vinyl acetate copolymer, ethylene-acrylate copolymer, ethylene-α-olefin-diene copolymer so long as a selected substance has the above-described properties. Among these substances, a high-pressure low-density polyethylene is preferably used, and particularly preferable is the use of a high-pressure radical-polymerized low-density polyethylene produced by an autoclave method in which polymerization is effected at a reaction temperature of not less than 220® under a reaction pressure of not more than 1700 kg/cm².

[II] Properties of Resin Composition and Proportion of Components A and B (1) Properties of Resin Composition A resin composition for extruded forms according to the present invention obtained as described above should preferably have the following properties: a melt flow rate within a range of from 0.5 to 10 g/10 min. as measured in accordance with JIS K7210, preferably from 1 to 8 g/10 min., and more preferably from 2 to 5 g/10 min.; a density within a range of from 0.88 to 0.925 g/cm³, preferably from 0.89 to 0.92 g/cm³, and more preferably from 0.90 to 0.915 g/cm³; a memory effect (ME) within a range from 1.0 to 2.0, preferably from 1.1 to 1.8, and more preferably from 1.2 to 1.6; and a melt tension (MT: stress at 50 m/min.) within a range of from 0.3 to 10 g, preferably from 0.5 to 5 g, and more preferably from 1 to 5 g.

The memory effect ME and the melt tension MT (stress at 50 m/min.) of the resin composition preferably satisfies the following interrelationship:

$$ME \geq [0.08 \times MT + 1]/g,$$

preferably $ME \geq [0.2 \times MT + 1.1]/g$ (2) Proportion of Components A and B A copolymer of ethylene and $C_4$ to $C_{40}$ α-olefin, serving as component A, and an ethylene-containing polymer, serving as component B, should be contained in a resin composition according to the present invention in an amount of 50 to 99% and an amount of 1 to 50%, respectively, both with respect to the total weight of the resin composition. Preferably, component A is contained in an amount of 75 to 99 wt % while component B is contained in an amount of 1 to 25 wt %. More preferably, these components A and B are contained in an amount of 80 to 97 wt % and an amount of 3 to 20 wt %, respectively, and most preferably, in an amount of 85 to 95 wt % and an amount of 5 to 15 wt %, respectively.

If component A is contained in too small an amount, properties such as heat sealability and transparency are impaired. If component B is contained in too small an amount, workability cannot be improved sufficiently.

[III] Production of Resin Composition (1) Mixing

A resin composition for extruded forms according to the present invention is produced by suitably mixing together a copolymer of ethylene and $C_4$ to $C_{40}$ α-olefin, serving as component A, and an ethylene-containing polymer, serving as component B. For this purpose, a method similar to a conventional method for the production of a resin composition may be used.

Specifically, component A and component B are melted and kneaded together by using an extruder, a Brabender Plastograph, a Banbury mixer, a kneader-blender or the like, to thereby obtain a resin composition according to the present invention. The thus obtained resin composition is normally formed into pellets by a commonly used method. The pellets may be used to form films or the like.

(2) Other Additives

A resin composition for extruded forms according to the present invention may contain auxiliary additives generally used in a resin composition, such as antioxidants (preferable examples of which are phenol-type and phosphorus-type antioxidants), anti-blocking agents, slip agents, heat stabilizers, light stabilizers, ultraviolet absorbers, neutralizers, anti-fogging agents, and/or colorants.

A resin composition according to the present invention may preferably contain, in addition to component A and component B, antioxidants, anti-blocking agents and slip agents as component C, component D, and component E, respectively. It is preferable that these components C, D and E comprise the substances described below, and be contained in the specific amounts described below.

① Antioxidant

An antioxidant added to a resin composition according to the invention may comprise a phenol antioxidant, or a phosphorus antioxidant, or both. A mixture of a phenol antioxidant and a phosphorus antioxidant is preferable.

(i) Specific examples of usable phenol antioxidants include: octadecyl 3-(3,5-di-t-butyl-4-hydroxyphenyl) propionate, pentaerythrityl-tetrakis[3-(3,5-di-t-butyl-4-hydroxyphenyl) propionate], 1,3,5-trimethyl-2,4,6-tris(3,5-di-t-butyl-4-hydroxybenzyl) benzene, 1,3,5-tris-[ethylene-3-(3,5-di-t-butyl-4-hydroxyphenyl) propionate]-s-triazine-2,4,6-(1H,3H,5H) trione, 1,1,3-tris(2-methyl-4-hydroxy-5-t-butylphenol) butane, 4,4-methylene-bis(2,6-di-t-butylphenol), hexamethylene glycol-bis[β-(3,5-di-t-butyl-4-hydroxyphenol) propionate], 6-(4-hydroxy-3,5-di-t-butylanilino) 2,4-bis-octyl-thio-1,3,5-triazole, 2,2-thio [diethyl-bis-3(3,5-di-t-butyl-4-hydroxyphenol) propionate], 2,2-methylene-bis(4-methyl-6-t-nonylphenol), 2,6-bis-(2-hydroxy-3-t-butyl-5-methylbenzoyl)-4-methylphenol, and tris[β-(3,5-di-t-butyl-4-hydroxyphenyl)propionyl-oxyethyl] isocyanurate. A single one of these substances, or a mixture thereof may be used. A phenol antioxidant having an alkyl group in the molecular structure thereof and also having a melting point of 40C or higher is preferable.

(ii) A phosphorus antioxidant which may be used in the present invention comprises at least one phosphorus compound selected from the group consisting of phosphites, phosphonites and phosphonic acid derivatives.

Specific examples of usable phosphites include triphenyl phosphite, diphenyl phosphite, didecyl phosphite, tridecyl phosphite, trioctyl phosphite, tridodecyl phosphite, trioctadecyl phosphite, trinonylphenyl phosphite, tridodecyl trithiophosphite, distearyl pentaerythritol diphosphite, 4,4-butylidene bis(3-methyl-6-t-butylphenylditridecyl) phosphite, tris(2,4-di-t-butylphenyl) phosphite, and bis(2,4-di-t-butylphenyl)pentaerythritol diphosphite. Other such examples include 4,4-isopropylidene diphenyltetraalkyl diphosphite having an alkyl group with 12 to 15 carbons.

Usable examples of phosphonites include tetrakis(2,4-dialkylphenyl)-4,4-biphenylene diphosphonite having an alkyl group with 1 to 30 carbons. Among these substances, tetrakis(2,4-di-t-butylphenyl)-4,4-biphenylene diphosphonite is particularly preferable.

Phosphonic acid derivatives are expressed by the following general formula (II):

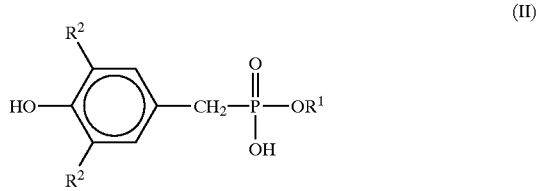

(II)

where $R^1$ represents hydrogen, a metal, or a straight-chain or branched alkyl group having 1 to 22 carbons, and $R^2$ represents a lower alkyl group having 1 to 6 carbons, preferably a tertiary butyl group.

Specific examples of usable phosphonic acid derivatives include calcium salts of 4-hydroxy-3,5-di-t-butyl-benzyl phosphonic acid, o-ethyl-(4-hydroxy-3,5-di-t-butylbenzyl) phosphonic acid, o-(2-ethylhexyl)-(4-hydroxy-3,5-di-t-butylbenzyl) phosphonic acid, and o-ethyl-(4-hydroxy-3,5-t-butylbenzyl) phosphonic acid.

Among the above-listed examples of phosphorus antioxidents, a phosphorus antioxidant having a melting point of 60® or higher is preferable. More preferable is a phosphite or a phosphonite, and most preferable is tris(2,4-di-t-butylphenyl) phosphite, in the case of a phosphite, or tetrakis(2,4-di-t-butylphenyl) phosphonite, in the case of a phosphonite.

When a mixture of a phenol antioxidant and a phosphorus antioxidant is used, the mixed antioxidant is contained in the resin composition in an amount of 0.01 to 1 part by weight, in total, per 100 parts by weight of the total amount of component A and component B, and the mixture contains the phenol antioxidant (Ph) and the phosphorus antioxidant (P) at a proportion expressed as follows:

Ph: P=20:80 to 80:20 wt %, preferably from 20:80 to 60:40 wt %, and more preferably from 30:70 to 50:50 wt %.

When only a phenol antioxidant is used, although heat deterioration can be restrained, yellowing tends to occur. When only a phosphorus antioxidant is used, heat deterioration can be restrained by only a limited extent. The use of both phenol and phosphorus antioxidents makes it possible to obtain a synergistic effect, by which both heat deterioration and yellowing can be effectively restrained with a small amount of antioxidant added.

② Anti-blocking Agent

A resin composition for extruded forms according to the present invention may preferably contain an anti-blocking agent for the purpose of preventing blocking and assuring the ability to open a formed film easily.

An anti-blocking agent used in the present invention may comprise one or more substances selected from among substances such as zeolite, synthetic silica, natural silica, talc, silicon dioxide, and amorphous aluminosilicate. Among these substances, zeolite, talc and amorphous aluminosilicate are preferable, and, more preferable are talc and amorphous aluminosilicate. A mixture of talc and either amorphous aluminosilicate or zeolite is particularly preferable.

An anti-blocking agent used in the present invention has an average grain size of not more than 10 μm, preferably, not more than 5 μm. Too great an average grain size causes some impairment in the transparency of a formed film.

An anti-blocking agent used in the present invention contains water in an amount of not more than 20% of the total weight thereof, preferably, not more than 10 wt %, and more preferably, not more than 5 wt %. Too great a water content causes foaming during formation, thereby making formation difficult.

③ Saturated- or Unsaturated-Fatty-Acid Amide (Slip Agent)

A resin composition for extruded forms according to the present invention may preferably contain a saturated- or unsaturated-fatty-acid amide (a slip agent) for the purpose of assuring easy-open ability of a formed film and preventing blocking.

A fatty acid amide used in the present invention comprises either a monoamide or bisamide of a saturated or unsaturated fatty acid. Specific examples of monoamides of saturated fatty acids which may be used, include palmitic acid amide, stearic acid amide, behenic acid amide, oxystearic acid amide, and methylol amide. Specific examples of usable monoamides of unsaturated fatty acids include oleic acid amide, erucic acid amide, linoleic acid amide, and ricinoleic acid amide. Specific examples of usable bisamides of saturated fatty acids include ethylenebisstearic acid amide, methylenebisstearic acid amide, and methylenebisstearobehenic acid amide. Specific examples of usable bisamides of unsaturated fatty acids include ethylenebisoleic acid amide, and methylenebisoleic acid amide.

Among these substances, preferable monoamides of saturated fatty acids are stearic acid amide, and behenic acid amide. Preferable monoamides of unsaturated fatty acids are oleic acid amide, and erucic acid amide. In the category of bisamides of saturated or unsaturated fatty acids, ethylenebisoleic acid amide is preferable. It is preferable to use a mixture of fatty acid amides in such a manner that a first component, comprising a monoamide of an unsaturated fatty acid, and a second component, comprising either a monoamide of a saturated fatty acid or a bisamide of a saturated or unsaturated fatty acid, are contained in the mixture at a proportion expressed as follows: first component:second component=80:20 to 20:80 wt %, preferably, from 75:25 to 60 to 40 wt %.

④ Amounts of Additives in Resin Composition

When an antioxidant, such as above, is contained as component C in a resin composition in according to the present invention, the antioxidant is contained in an amount within a range from 0.01 to 1 part by weight, preferably 0.03 to 0.5 part by weight, and more preferably from 0.05 to 0.2 part by weight, per 100 parts of the total amount of component A and component B also contained in the resin composition. Too small an amount of component C is not preferable because heat deterioration of the resin may occur, thereby making extrusion difficult during forming. Too large an amount of component C is not preferable either, because this may cause yellowing, cause bleedout, or impair heat sealability.

An anti-blocking agent, such as above, is contained as component D in the resin composition in an amount within a range from 0.01 to 1 part by weight, preferably from 0.1 to 0.8 part by weight, and more preferably from 0.3 to 0.7 part by weight, per 100 parts of the total amount of component A and component B. Too small an amount of component D is not preferable because a formed film is likely to suffer from blocking. Too large an amount of component D is not preferable either, because this may impair transparency.

A slip agent, such as above, is contained as component E in the resin composition in an amount within a range from 0.01 to 1 part by weight, preferably 0.03 to 0.5 part by weight, and more preferably from 0.05 to 0.2 part by weight, per 100 parts of the total amount of component A and component B. Too small an amount of component E is not preferable because a formed film may have poor slip properties. Too large an amount of component E is not preferable either, because those components of the resin which bleed out to the surface of a formed film may increase, thereby impairing heat sealability, etc.

[IV] Forming of Extruded Form

Pellets obtained as described above may be suitably formed to produce a film or sheet.

Such a film may be produced by performing air-cooled inflation forming, two-stage air-cooled inflation forming, T-die film forming, water-cooled inflation forming, or the like, thereby obtaining a film which may be advantageously used as a wrapping or packaging material, etc.

A sheet may be produced by performing calendering, extrusion forming, compression molding, casting, or the like, thereby obtaining a sheet which may be advantageously used as a wrapping/packaging material, etc.

The present invention will be described more specifically by examples thereof.

[I] Methods for Property Measurement and Evaluation

Before entering into the description of the examples of the present invention and comparative examples, which will be given in section [II], certain methods used to measure various properties of these examples and to evaluate these examples will be outlined.

(1) Methods for Property Measurement (a) Melt Flow Rate: JIS K7210 (at a temperature of 190® under a load of 2.16 kg)

(b) Density: JIS K7112

(c) Memory Effect (ME): A melt indexer of the type described in JIS K7210 is used under measurement conditions comprising a cylinder temperature of 240® and a constant rate extrusion amount of 3 g/min.

Each sample is charged into the apparatus, and only the piston is placed on the sample. After the passage of 6 minutes, the prescribed extrusion rate is applied. Then, a graduated cylinder containing ethyl alcohol is placed immediately below the orifice of the die, and a straight extrudate is collected. The diameter $D_1$ of the collected extrudate is measured with a micrometer, and the memory effect ME of the sample is calculated by the following formula:

$$ME=D_1/D_0 \text{ } (D_0: \text{ the diameter of the orifice})$$

(d) Elution Curve: In the present invention, the peak of an elution curve obtained by temperature rising elution fractionation (TREF) is checked. TREF is performed in principle as follows: The relevant polymer is completely dissolved in a solvent at a high temperature. Thereafter, the resulting solution is cooled, so that a thin polymer layer is formed on the surface of an inactive carrier. Then, temperature is raised continuously or in a stepwise manner, and eluted fractions of the polymer are collected. The concentrations of fractions eluted at each temperature are successively detected, and each elution volume is plotted against elution temperatures to obtain an elution curve in a graphical representation. The component distribution of the polymer can be determined on the basis of the elution curve. In the present invention, the peak of such an elution curve is checked.

An elution curve of a sample is obtained in the following manner:

The apparatus used for measurement is a cross fractionating apparatus ("CFC T150A" (trade name); produced by Mitsubishi Pertrochemical Co., Ltd.), and measurement is performed in accordance with the method described in an operation manual attached to the apparatus.

The cross fractionating apparatus includes two on-line connected sections, that is, a temperature rising elution fractionation (TREF) mechanism for fractionating a sample by utilizing differences in dissolution temperature between various portions thereof, and a size exclusion chromatography (SEC) section for separating each fractionated portion by the size of molecules.

First, a sample (a copolymer) to be measured is dissolved in a solvent of o-dichlorobenzene at a temperature of 140® to prepare a sample solution having a sample concentration of 4 mg/ml. The sample solution is charged into the sample loop of the apparatus. Thereafter, the apparatus automatically performs measurements at set conditions. 0.4 ml of the sample solution retained in the sample loop is fed to a TREF column (a stainless-steel column attached to the apparatus, the column being filled with glass beads serving as an inactive carrier, and having an inner diameter of 4 mm and a length of 150 mm). Then, the fed sample is cooled from 140® to 0® at a cooling speed of 1®/min., thereby causing the sample to be coated on the surface of the inactive carrier. In this process, a polymer layer is formed on the surface of the inactive carrier in such a manner that components which are relatively highly crystalline (components capable of being crystallized easily) enter first into the layer, and then components which are relatively lowly crystalline (components not capable of being crystallized easily) add to the layer. After the TREF column has been held at 0® for 30 min., a 2-ml fraction eluted at 0C is fed from the TREF column to a SEC column unit comprising three SEC columns ("AD80M/S" (trade name); produced by Showa Denko K.K.) at a flow rate of 1 ml/min.

While the SEC section performs separation by molecular size, the temperature of the TREF column is raised to a subsequent elution temperature (5®, in this case), and maintained at this temperature for approximately 30 min. Thus, the SEC column unit subsequently performs the separation of each eluted fraction at a cycle of 39 min. The elution temperature is raised stepwise from 0® to 5, 10, 15, 20, 25, 30, 35, 40, 45, 49, 52, 55, 58, 61, 64, 67, 70, 73, 76, 79, 82, 85, 88, 91, 94, 97, 100, 102, 120, and 140®.

The portions of the sample solution separated by the SEC column unit by molecular size are processed by an infrared spectrophotometer attached to the apparatus. The infrared spectrophotometer measures, through detection with a wavelength of 3.42 $\mu$ on the basis of stretching vibration of methylene, the absorbance of each separated portion that corresponds to the concentration of the polymer in the particular portion. Thus, chromatograms concerning individual fractions eluted at various elution temperatures are obtained.

Thereafter, data processing softwear provided in the apparatus is used. Specifically, a base line is drawn in each of the chromatograms resulting from the above measurement, and the following calculations are performed: The individual areas of the chromatograms are integrated, and an integral elution curve is obtained. Further, the integral elution curve is differentiated with respect to temperature, thereby obtaining a differential elution curve. The graphs resulting from these calculations are output to a printer connected with the apparatus.

In the thus output graph of the differential elution curve, the abscissa represents the elution temperature with a dimension of 89.3 mm of the abscissa corresponding to a change through 100®, and the ordinate represents the differential elution volume with a dimension of 76.5 mm of the ordinate corresponding to a change through 0.1 when the entire integral elution volume is 1.0 and each differentiated quantity consists of a change in elution volume with a change in temperature by 1®. The height H in millimeters of the peak of the differential elution curve is divided by the width W in millimeters of the curve at half of the height H, thereby calculating the ratio H/W of the differential elution curve of the particular sample.

(e) Q Value: An apparatus for size exclusion chromatography (SEC) is used for measuring each Q value (weight-average molecular weight/number-average molecular weight) under the conditions shown below. In this measurement, a universal calibration curve is obtained by using monodisperse polystyrene, and the molecular weights are calculated as those of straight-chain polyethylene:

Apparatus type: Waters Model 150C GPC
Solvent: o-dichlorobenzene
Flow rate: 1 ml/min.
Temperature: 140®
Measurement concentration: 2 mg/ml
Charged amount: 200 $\mu$l
Columns: three columns ("AD80M/S" (trade name); produced by Showa Denko K.K.)

(f) Melt Tension (MT): The melt tension of a sample (component B or resin composition) is measured by using a Capillograph 1-B (trade name; produced by Toyo Seiki K.K.), and checking the take-off speed at which each sample in its molten resin state extruded at a test temperature of 190® at an extrusion speed of 1 cm/min. is taken off. The stress at which fracture occurs is determined to be the melt tension of each component B, and the stress at a take-off speed of 50 m/min. is determined to be the melt tension of each resin component.

(2) Methods for Evaluation (a) Haze: JIS K7105

(b) Hexane-soluble Amount:

① A thimble is continually dried under a reduced pressure at a temperature of 60® in such a manner that the thimble is precision-weighed every two hours. Drying and weighing are repeated until a difference between the current weight and the previous weight of 50 mg is obtained. Then, 5 g or thereabout of each sample (resin composition) is precision weighed, and charged into the thimble.

② Reflux extraction is performed for three hours by using 200 cc of hexane and a high-temperature Soxhlet extractor. A reflux ratio of 3 to 4 times per 10 min. is adopted.

③ After the resultant contents of the thimble, which remain after the extraction, are cooled to normal temperature, the contents, as well as the thimble, are reduced-pressure dried at a temperature of 60® for two hours.

④ The resultant thimble and the contents are allowed to cool in a desiccator for 30 min., and then precision-weighed.

⑤ The amount of components of the sample which are soluble in hexane (hexane-soluble amount) is determined by the following equation:

Hexane-soluble amount (wt %)=(W1+W3−W2)/W1
 W1: weight (g) of sample before extraction
 W2: total weight (g) of sample and thimble after extraction
 W3: weight (g) of unused thimble after pressure-reduced drying (c) Heptane-soluble amount: Measurement is performed in accordance with the tests for instruments, containers and wrapping/packaging materials described in standards for food additives and the like (Notification No. 370 of the Japanese Ministry of Health and Welfare issued in 1959). Elution conditions comprising a temperature of 25® and a period of 60 minutes are adopted.

(d) Dart Drop Impact (DDI): JIS Z1707

(e) 300-g Heat Sealing Temperature: Each sample (extruded form) is heat sealed with a platen heat sealer (produced by Toyo Seiki K.K.) at each sealing temperature subsequently varied from 75® by 5®, at a sealing pressure of 2 kg/cm², and for a sealing period of 1 sec. After each heat sealing operation, heat sealing strength is measured with a tensile tester. The temperature at which a heat sealing strength of 300 g is obtained, is determined as the 300 g-heat sealing temperature of the sample.

(f) Vicat Softening Point: JIS K7206

(g) Embrittlement Point: Measurement is performed by a method developed by Institute for Telecommunications Sciences (notched depth: 0.3 mm).

(h) Bubble Stability: When 50 m of a formed film has the maximum $L_A$ and the minimum $L_B$ of the lay-flat width thereof, the ratio C expressed by the following equation is obtained:

$$C (\%) = [(L_A - L_B)/\{½ (L_A + L_B)\}] \times 100$$

When the ratio C is not more than 20%, the sample is regarded as having good bubble stability.

(i) Tensile Strength Elongation: JIS K6781

(j) Static Coefficient of Friction: ASTM D1894

(k) Blocking:

Two pieces of each sample having dimensions of 200 mm×300 mm are overlapped with each other with a contact area of 20 mm×50 mm, and are thus paired. Then, a layered structure was obtained by subsequently laying a sheet of glass, a thin sheet of paper, the paired sample pieces, another thin sheet of paper, and another sheet of glass on each other in this order. The structure was placed in a Geer oven, and subjected to a load of 15 kg from above and below at a temperature of 45°C for a period of 24 hours. Thereafter, the resultant sample pieces are taken out of the oven, and the overlapped portion of the sample pieces is formed into a shape having a width of 20 mm and a length of 50 mm. Then, a tensile tester is used to shear-separate the formed sample pieces at a speed of 500 mm/min. The maximum load (g) in this process is read.

(1) ΔMFR: The melt flow rates of each resin composition before and after the granulation thereof with a uniaxial extruder at a temperature of 250°C, are measured in accordance with JIS K7210, and the difference MFR between the measured melt flow rates is obtained.

(m) Tint: JIS K7103

[II] EXAMPLES

EXAMPLE 1

Preparation of Copolymer of Ethylene and $C_4$ to $C_{40}$ α-Olefin (Component A)

A catalyst was prepared using the method described in Japanese Patent Laid-Open No. 61-130314. Specifically, 2.0 mmol of complex ethylene-bis(4, 5, 6, 7-tetrahydroindenyl) zirconium dichloride was mixed with methyl alumoxane (produced by Toyo Stauffer K.K.) in an amount of 1000 times the molar amount of the complex, and the resultant mixture was diluted in toluene to prepare 10 liters of a catalyst solution. Then, polymerization was performed in the following manner by using the catalyst.

A mixture of ethylene and 1-hexene was supplied into an agitation autoclave type continuous reactor having an inner volume of 1.5 liters in such a manner that the proportion of 1-hexene as 80% of the total weight of the mixture. The pressure within the reactor was maintained at 1000 kg/cm², and reaction was performed at 150°C.

After thereaction had completed, an ethylene-α-olefin copolymer (containing 1-hexene in an amount of 15% of the total weight of the copolymer) which was to serve as component A, was obtained. The copolymer had the following properties: a melt flow rate (MFR) of 3.3 g/10 min.; a density of 0.905 g/cm³; a Q value of 2.0; a TREF elution curve having a single peak corresponding to a temperature of 62°C, and also having a H/W ratio of 4 at that temperature; and an elution volume at 50°C of 12 wt %.

Ethylene-containing Polymer (Component B)

An ethylene-containing polymer comprising a high-pressure low-density polyethylene, to serve as component B, was obtained by an autoclave method at a reaction temperature of 260°C at a reaction pressure of 1500 kg/cm². As a result, a high-pressure low-density polyethylene having an MFR of 4 kg/10 min., a density of 0.92 g/cm³, a memory effect (ME) of 2.4, a Q value of 10, and a melt tension (MT) of 9.4 g, was obtained.

Production of Resin Composition

As shown in Table 1, the above ethylene-α-olefin copolymer (component A) and the ethylene-containing polymer, i.e., the high-pressure low-density polyethylene, (component B) were blended together at a proportion of component A component B=95:5 in wt %, and the resulting mixture was granulated with a uniaxial extruder (diameter: 40 mm) at a forming temperature of 160°C, thereby obtaining a resin composition in the form of a pellet, which composition contained ethylene-α-olefin copolymer (component A) and the ethylene-containing copolymer (component B) in the above-specified proportion.

Evaluation

The pellet-shaped resin composition was pressed, and its Vicat softening point as well as embrittlement point were measured.

Further, the pellet-shaped resin composition was formed into a film with an inflation forming machine having a diameter of 40 mm (produced by Tomy Kikai Kogyo K.K.) under the following conditions:

Screw diameter: 40 mm

L/D: 24

Die diameter: 75 mm

Die lip dimension: 3 mm

Forming temperature: 180°C

Film thickness: 30 μm

Frost line distance: 180 mm

Screw speed: 60 rpm

Blow ratio: 2.0

Chiller Temperature: 15°C

The thus obtained films were evaluated. The results of the evaluation are shown in Table 1.

Examples 2 to 8 and Comparative Examples 1 to 4 and 6 to 11

Resin compositions serving as other examples of the present invention and comparative examples were each produced in the same manner as that in Example 1 except that, in each of the above examples, component A and component B having the properties shown in Table 1 were used. The resultant resin compositions were formed and evaluated as in Example 1.

The results of the evaluation are also shown in Table 1.

Comparative Example 5

Another resin composition for comparison was obtained in the same manner as that in Example 1 except that component A was substituted by an ethylene-α-olefin copolymer prepared by using a Ziegler catalyst. This resin composition was formed and evaluated as in Example 1. The results of the evaluation are shown in Table 1.

TABLE 1

| | Example No. | | | | |
|---|---|---|---|---|---|
| | 1 | 2 | 3 | 4 | 5 |
| Component A | | | | | |
| MFR (g/10 min.) | 3.3 | 2.3 | 1.0 | 3.3 | 3.3 |
| Density (g/cm³) | 0.905 | 0.891 | 0.903 | 0.920 | 0.905 |

TABLE 1-continued

|  | | | | | |
|---|---|---|---|---|---|
| TREF | | | | | |
| Number of peaks | 1 | 1 | 1 | 1 | 1 |
| Peak temperature (τ) | 62 | 42 | 61 | 83 | 62 |
| H/W | 4 | 2.5 | 4 | 20 | 4 |
| Elution volume at 50τ (%) | 12 | 75 | 12 | 1 | 12 |
| Q value | 2.0 | 2.0 | 2.0 | 2.0 | 2.0 |
| Component B | | | | | |
| MFR (g/10 min.) | 4 | 4 | 4 | 4 | 1 |
| Density (g/cm³) | 0.92 | 0.92 | 0.92 | 0.92 | 0.92 |
| ME | 2.4 | 2.4 | 2.4 | 2.4 | 2.6 |
| MT (g) | 9.4 | 9.4 | 9.4 | 9.4 | 12.1 |
| Q value | 12 | 12 | 12 | 12 | 5.7 |
| Ratio Comp. A:Comp. B | 95:5 | 95:5 | 95:5 | 95:5 | 95:5 |
| Composition | | | | | |
| MFR (g/10 min.) | 3.3 | 2.4 | 1.2 | 3.3 | 3.0 |
| Density (g/cm³) | 0.905 | 0.891 | 0.903 | 0.920 | 0.904 |
| ME | 1.2 | 1.2 | 1.4 | 1.2 | 1.2 |
| MT (g) | 1.0 | 1.2 | 2.2 | 1.4 | 1.3 |
| Properties | | | | | |
| Haze (%) | 2.7 | 2.1 | 2.8 | 3.9 | 2.9 |
| Hexane solubles (wt %) | 10.8 | 28.0 | 10.6 | 1.1 | 10.7 |
| DDI (kg · cm) | 68 | 44 | 65 | 20 | 63 |
| Heat-sealing strength at 300 g load (τ) | 95 | 81 | 94 | 119 | 96 |
| Heptane solubles (ppm) | 17 | 30 | 9 | 6 | 17 |
| Vicat softening point (τ) | 91 | 79 | 90 | 104 | 92 |
| Brittleness temperature (τ) | N | N | N | −46.0 | N |
| Bubble stability | good | good | good | good | good |

|  | Example No. | | | Comparative Ex. No. | |
|---|---|---|---|---|---|
|  | 6 | 7 | 8 | 1 | 2 |
| Component A | | | | | |
| MFR (g/10 min.) | 3.3 | 3.3 | 3.3 | 0.01 | 10 |
| Density (g/cm³) | 0.905 | 0.905 | 0.905 | 0.908 | 0.905 |
| TREF | | | | | |
| Number of peaks | 1 | 1 | 1 | 1 | 1 |
| Peak temperature (° C.) | 62 | 62 | 62 | 63 | 60 |
| H/W | 4 | 4 | 4 | 4 | 4 |
| Elution volume at 50° C. (%) | 12 | 12 | 12 | 11 | 14 |
| Q value | 2.0 | 2.0 | 2.0 | 2.0 | 2.0 |
| Component B | | | | | |
| MFR (g/10 min.) | 15 | 4 | 4 | 4 | 4 |
| Density (g/cm³) | 0.92 | 0.92 | 0.92 | 0.92 | 0.92 |
| ME | 1.8 | 2.4 | 2.4 | 2.4 | 2.4 |
| MT (g) | 5.3 | 9.4 | 9.4 | 9.4 | 9.4 |
| Q value | 18 | 12 | 12 | 12 | 12 |
| Ratio Comp. A:Comp. B | 95:5 | 85:15 | 75:25 | 95:5 | 95:5 |
| Composition | | | | | |
| MFR (g/10 min.) | 4.0 | 3.5 | 3.6 | 0.21 | 9.6 |
| Density (g/cm³) | 0.905 | 0.909 | 0.912 | 0.905 | 0.906 |
| ME | 1.2 | 1.3 | 1.45 | 1.6 | 1.1 |
| MT (g) | 0.6 | 2.0 | 3.1 | x | x |
| Properties | | | | | |
| Haze (%) | 2.6 | 6.1 | 8.0 | — | — |
| Hexane solubles (wt %) | 10.9 | 10.8 | 10.9 | — | — |
| DDI (kg · cm) | 64 | 89 | 92 | — | — |
| Heat-sealing strength at 300 g load (° C.) | 96 | 96 | 97 | — | — |
| Heptane solubles (ppm) | 17 | 17 | 17 | — | — |
| Vicat softening point (° C.) | 89 | 90 | 90 | — | — |
| Brittleness temperature (° C.) | −65.5 | −67.5 | −62.5 | — | — |
| Bubble stability | good | good | good | no formation | poor |

|  | Comparative Example No. | | | | |
|---|---|---|---|---|---|
|  | 3 | 4 | 5 | 6 | 7 |
| Component A | | | | | |
| MFR (g/10 min.) | 3.6 | 3.0 | 2.0 | 3.5 | 3.8 |
| Density (g/cm³) | 0.872 | 0.935 | 0.919 | 0.885 | 0.901 |
| TREF | | | | | |
| Number of peaks | 1 | 1 | 2 | 1 | 1 |
| Peak temperature (τ) | 30 | 100 | 77, 94 | 26 | 50 |
| H/W | 1 | 48 | 0.90, 2.9 | 1.8 | 3.5 |
| Elution volume at 50τ (%) | 100 | 0 | 10 | 100 | 70 |
| Q value | 2.0 | 2.0 | 3.8 | 2.0 | 2.3 |
| Component B | | | | | |
| MFR (g/10 min.) | 4 | 4 | 4 | 4 | 4 |
| Density (g/cm³) | 0.92 | 0.92 | 0.92 | 0.92 | 0.92 |
| ME | 2.4 | 2.4 | 2.4 | 2.4 | 2.4 |
| MT (g) | 9.4 | 9.4 | 9.4 | 9.4 | 9.4 |
| Q value | 12 | 12 | 12 | 12 | 12 |
| Ratio Comp. A:Comp. B | 95:5 | 95:5 | 95:5 | 95:5 | 95:5 |
| Composition | | | | | |
| MFR (g/10 min.) | 3.6 | 3.1 | 2.1 | 3.5 | 3.8 |
| Density (g/cm³) | 0.874 | 0.934 | 0.920 | 0.887 | 0.902 |
| ME | 1.2 | 1.4 | 1.3 | 1.2 | 1.2 |
| MT (g) | 0.4 | 1.8 | 2.5 | 0.5 | 0.6 |
| Properties | | | | | |
| Haze (%) | 1.5 | 9.0 | 6.0 | 1.5 | 1.8 |
| Hexane solubles (wt %) | 100 | 0.5 | 4.0 | 100 | 100 |
| DDI (kg · cm) | 25 | 10 | 15 | 18 | 50 |
| Heat-sealing strength at 300 g load (τ) | 75 | 142 | 113 | 70 | 94 |
| Heptane solubles (ppm) | 120 | 4 | 28 | 170 | 250 |
| Vicat softening point (τ) | 45 | 133 | 99 | 45 | 62 |
| Brittleness temperature (τ) | N | −35.0 | −35.0 | N | −60.0 |
| Bubble stability | good | a little poor | good | good | good |

|  | Comparative Example No. | | |
|---|---|---|---|
|  | 8 | 9 | 11 |
| Component A | | | |
| MFR (g/10 min.) | 3.3 | 3.3 | 3.3 |
| Density (g/cm³) | 0.905 | 0.905 | 0.905 |
| TREF | | | |
| Number of peaks | 1 | 1 | 1 |
| Peak temperature (τ) | 62 | 62 | 62 |
| H/W | 4 | 4 | 4 |
| Elution volume at 50τ (%) | 12 | 12 | 12 |
| Q value | 2.0 | 2.0 | 2.0 |
| Component B | | | |
| MFR (g/10 min.) | 0.01 | 30 | 4 |
| Density (g/cm³) | 0.92 | 0.92 | 0.94 |
| ME | 2.7 | 1.6 | 2.3 |
| MT (g) | 9.4 | 3.1 | 8.1 |
| Q value | 12 | 22 | 7.3 |
| Ratio Comp. A:Comp. B | 95:5 | 95:5 | 95:5 |

TABLE 1-continued

| Composition | | | |
|---|---|---|---|
| MFR (g/10 min.) | 3.4 | 4.6 | 3.3 |
| Density (g/cm$^3$) | 0.906 | 0.906 | 0.907 |
| ME | 1.2 | 1.2 | 1.2 |
| MT (g) | x | 0.3 | 0.9 |
| Properties | | | |
| Haze (%) | — | — | — |
| Hexane solubles (wt %) | — | — | — |
| DDI (kg · cm) | — | — | — |
| Heat-sealing strength at 300 g load (τ) | — | — | — |
| Heptane solubles (ppm) | — | — | — |
| Vicat softening point (τ) | — | — | — |
| Brittleness temperature (τ) | — | — | — |
| Bubble stability | poor appearance | poor | poor |

Note:
N: not broken
x: not measured

Examples 9 to 17 and Comparative Examples 14 to 16 and 18 to 20

Pellet-shaped resin compositions serving as still other examples of the present invention and other comparative examples were produced in the same manner as that in Example 1 except that, in each of the above examples, component A and component B having the properties shown in Table 2 were used.

Each of the thus obtained pellets was measured with respect to melt flow rate, density, melt tension and memory effect thereof. Further, the pellets were formed into a pressed sheet with a thickness of 2 μm, and the Vicat softening point, the embrittlement point and the haze of the pressed sheet were measured. The results of the measurements are also shown in Table 2.

EXAMPLE 18

Another resin composition of the present invention was obtained in the same manner as that in Example 1 except that component A was substituted by the substance shown in Table 2, and that component B was substituted by low-density polyethylene ("Mitsubishi Polyethy LL" SF520 (trade name); produced by Mitsubishi Petrochemical Co., Ltd.). The resin composition was evaluated as in Example 1. The results of the evaluation are shown in Table 2.

Comparative Example 17

Another resin composition for comparison was obtained in the same manner as that in Example 1 except that component A was substituted by "Ultzex" 1520L (trade name, produced by Mitsui Petrochemical Industries, Ltd.). This resin composition was evaluated as in Example 1. The results of the evaluation are shown in Table 2.

Comparative Example 21

Still another resin composition for comparison was obtained in the same manner as that in Example 1 except that no component A was used, and only component B was used. This resin composition was evaluated as in Example 9. The results of the evaluation are also shown in Table 2.

TABLE 2

| | Example No. | | | | |
|---|---|---|---|---|---|
| | 9 | 10 | 11 | 12 | 13 |
| Component A | | | | | |
| MFR (g/10 min.) | 1 | 1 | 1 | 1 | 1 |
| Density (g/cm$^3$) | 0.906 | 0.891 | 0.906 | 0.906 | 0.906 |
| TREF | | | | | |
| Number of peaks | 1 | 1 | 1 | 1 | 1 |
| Peak temperature (τ) | 64 | 43 | 64 | 64 | 64 |
| H/W | 8.5 | 2.5 | 8.5 | 8.5 | 8.5 |
| Elution volume at 50τ (%) | 3 | 71 | 3 | 3 | 3 |
| Q value | 1.9 | 2.0 | 1.9 | 1.9 | 1.9 |
| Component B | | | | | |
| MFR (g/10 min.) | 4 | 4 | 4 | 18 | 4 |
| Density (g/cm$^3$) | 0.92 | 0.92 | 0.92 | 0.92 | 0.92 |
| ME | 2.4 | 2.4 | 2.4 | 2.0 | 1.8 |
| MT (g) | 9.4 | 9.4 | 9.4 | 6.5 | 9.0 |
| Q value | 12 | 12 | 12 | 13 | 13 |
| Ratio Comp. A:Comp. B | 95:5 | 95:5 | 80:20 | 95:5 | 95:5 |
| Composition | | | | | |
| MFR (g/10 min.) | 1.1 | 1.1 | 1.6 | 1.8 | 1.1 |
| Density (g/cm$^3$) | 0.907 | 0.892 | 0.909 | 0.907 | 0.907 |
| ME | 1.4 | 1.4 | 1.5 | 1.3 | 1.3 |
| MT (g) | 2.6 | 2.6 | 3.6 | 2.4 | 2.5 |
| Properties | | | | | |
| Haze (%) | 30 | 10 | 33 | 32 | 31 |
| Vicat softening point (τ) | 97 | 75 | 97 | 95 | 96 |
| Brittleness temperature (τ) | −62.5 | −70> | −56.5 | −60.0 | −62.5 |

| | Example No. | | | | |
|---|---|---|---|---|---|
| | 14 | 15 | 16 | 17 | 18 |
| Component A | | | | | |
| MFR (g/10 min.) | 1 | 1 | 1 | 2.1 | 1 |
| Density (g/cm$^3$) | 0.906 | 0.906 | 0.906 | 0.910 | 0.891 |
| TREF | | | | | |
| Number of peaks | 1 | 1 | 1 | 1 | 1 |
| Peak temperature (τ) | 64 | 64 | 64 | 68 | 43 |
| H/W | 8.5 | 8.5 | 8.5 | 5.2 | 2.5 |
| Elution volume at 50τ (%) | 3 | 3 | 3 | 3 | 71 |
| Q value | 1.9 | 1.9 | 1.9 | 1.9 | 2.0 |
| Component B | | | | | |
| MFR (g/10 min.) | 4 | 4 | 1 | 4 | 0.8 |
| Density (g/cm$^3$) | 0.935 | 0.91 | 0.92 | 0.92 | 0.925 |
| ME | 2.4 | 2.4 | 2.4 | 2.4 | 1.5 |
| MT (g) | 9.4 | 9.4 | 10.1 | 9.4 | 2.5 |
| Q value | 12 | 12 | 12 | 12 | 3.2 |
| Ratio Comp. A:Comp. B | 95:5 | 95:5 | 95:5 | 95:5 | 80:20 |
| Composition | | | | | |
| MFR (g/10 min.) | 1.1 | 1.1 | 1.0 | 2.2 | 0.9 |
| Density (g/cm$^3$) | 0.907 | 0.906 | 0.907 | 0.911 | 0.898 |
| ME | 1.4 | 1.4 | 1.4 | 1.3 | 1.3 |
| MT (g) | 2.6 | 2.6 | 2.6 | 2.4 | 2.1 |
| Properties | | | | | |
| Haze (%) | 35 | 30 | 31 | 58 | 21 |
| Vicat softening point (τ) | 98 | 93 | 97 | 95 | 72 |

TABLE 2-continued

| | | | | |
|---|---|---|---|---|
| Brittleness temperature (τ) | −57.5 | −62.0 | −62.5 | −56.5 | −65.0 |

| | Comparative Example No. | | | |
|---|---|---|---|---|
| | 14 | 15 | 16 | 17 |
| Component A | | | | |
| MFR (g/10 min.) | 25 | 1 | 1 | 2.2 |
| Density (g/cm³) | 0.905 | 0.875 | 0.935 | 0.913 |
| TREF | | | | |
| Number of peaks | 1 | 1 | 1 | 2 |
| Peak temperature (τ) | 58 | 30 | 97 | 72, 90 |
| H/W | 3 | 1.1 | 34 | —, — |
| Elution volume at 50τ (%) | 22 | 100 | 0 | 7.6 |
| Q value | 2.0 | 2.3 | 1.9 | 2.8 |
| Component B | | | | |
| MFR (g/10 min.) | 4 | 4 | 4 | 4 |
| Density (g/cm³) | 0.92 | 0.92 | 0.92 | 0.92 |
| ME | 2.4 | 2.4 | 2.4 | 2.4 |
| MT (g) | 9.4 | 9.4 | 9.4 | 9.4 |
| Q value | 12 | 12 | 12 | 12 |
| Ratio Comp. A:Comp. B | 95:5 | 95:5 | 95:5 | 95:5 |
| Composition | | | | |
| MFR (g/10 min.) | 24 | 1.1 | 1.1 | 2.3 |
| Density (g/cm³) | 0.906 | 0.877 | 0.934 | 0.913 |
| ME | 1.2 | 1.3 | 1.3 | 1.4 |
| MT (g) | 0.6 | 1.6 | 2.8 | 2.8 |
| Properties | | | | |
| Haze (%) | 60 | — | 95 | 60 |
| Vicat softening point (τ) | 77 | *1 | 114 | 97 |
| Brittleness temperature (τ) | −30.5 | −70> | −40.0 | −45.0 |

| | Comparative Example No. | | | |
|---|---|---|---|---|
| | 18 | 19 | 20 | 21 |
| Component A | | | | |
| MFR (g/10 min.) | 1 | 1 | 1 | — |
| Density (g/cm³) | 0.881 | 0.902 | 0.906 | — |
| TREF | | | | |
| Number of peaks | 1 | 1 | 1 | — |
| Peak temperature (τ) | 25 | 55 | 64 | — |
| H/W | 1.2 | 0.9 | 2.9 | — |
| Elution volume at 50τ (%) | 100 | 54 | 39 | — |
| Q value | 2.1 | 2.1 | 1.0 | — |
| Component B | | | | |
| MFR (g/10 min.) | 4 | 4 | 4 | 4 |
| Density (g/cm³) | 0.92 | 0.92 | 0.92 | 0.92 |
| ME | 2.4 | 2.4 | 2.4 | 2.4 |
| MT (g) | 9.4 | 9.4 | 9.4 | 9.4 |
| Q value | 12 | 12 | 12 | 12 |
| Ratio Comp. A:Comp. B | 95:5 | 95:5 | 95:5 | 0:100 |
| Composition | | | | |
| MFR (g/10 min.) | 1.1 | 1.1 | 1.1 | — |
| Density (g/cm³) | 0.883 | 0.903 | 0.907 | — |
| ME | 1.4 | 1.3 | 1.4 | — |
| MT (g) | 2.4 | 2.4 | 2.4 | — |
| Properties | | | | |
| Haze (%) | — | — | — | 78 |
| Vicat softening point (τ) | *1 | 71 | 78 | 86 |
| Brittleness temperature (τ) | −70> | −47.5 | −60.0 | −2.5 |

Note: *1: Measurement was impossible.

Examples 19 to 20

Preparation of Master Batches

A master batch of each of an antioxidant, an anti-blocking agent, and a slip agent was prepared in the following manner. A substance of the same type as component A was used as the base for each master batch. A suitable amount of the base and a suitable amount of each additive, as well as an antioxidant, were mixed and kneaded together with a steam roll at a temperature of 120®. Each of the resultant resin masses was formed into a sheet with a cooling roll, and into pellets with a sheet pelletizer.

Blending, Forming, and Evaluation

The master batches and component B were dry-blended with component A at each of the proportions shown in Table 3. Each of the resultant blends was used to perform T-die film forming under the following conditions:

Apparatus type: T-die forming machine with a diameter of 35 mm (produced by Placo K.K.)

Forming temperature: 250®

Take-off Speed: 12.5 m/min.

Film thickness: 40 μm

The formed films were evaluated. The results of the evaluation are shown in Table 3.

TABLE 3

| | Example No. | | |
|---|---|---|---|
| | 19 | 20 | 21 |
| Component A | | | |
| MFR (g/10 min.) | 3.3 | 2.3 | 3.3 |
| Density (g/cm³) | 0.905 | 0.891 | 0.905 |
| TREF | | | |
| Number of peaks | 1 | 1 | 1 |
| Peak temperature (τ) | 62 | 42 | 62 |
| H/W | 4 | 2.5 | 4 |
| Elution volume at 50τ (%) | 12 | 75 | 12 |
| Q value | 2.0 | 1.9 | 2.0 |
| Component B | *1 | *1 | *1 |
| MFR (g/10 min.) | 3.8 | 3.8 | 3.8 |
| Density (g/cm³) | 0.92 | 0.92 | 0.92 |
| ME | 2.5 | 2.5 | 2.5 |
| MT (g) | 9.8 | 9.8 | 9.8 |
| Q value | 12 | 12 | 12 |
| Component C (Stabilizer) | | | |
| Phenol type (Ph) | *2 | *2 | *2 |
| Phosporus type (P) | *3 | *3 | *3 |
| Ratio (Ph/P) | 50/50 | 50/50 | 50/50 |
| Component D (Anti-blocking agent) | *4 | *4 | *4 + talc |
| Average particle size (μm) | 3.0 | 3.0 | 3.0  2.3 |
| Water content (%) | 3 | 3 | 3  0.3 |
| Component E (Slip agent) | | | |
| Saturated fatty acid (1) | *5 | *5 | — |
| Unsaturated fatty acid (2) | *6 | *6 | *6 + *7 |
| Ratio (1)/(2) | 30/70 | 30/70 | (*6/*7 = 70/30) |

TABLE 3-continued

| | Example No. | | |
|---|---|---|---|
| | 19 | 20 | 21 |
| Content of components | | | |
| Ratio (Comp. A/Comp. B) | 95/5 | 95/5 | 95/5 |
| Component C (parts by weight) | 0.1 | 0.1 | 0.1 |
| Component D (parts by weight) | 0.6 | 0.6 | 0.5/0.1 |
| Component E (parts by weight) | 0.08 | 0.08 | 0.08 |
| Composition | | | |
| MFR (g/10 min.) | 3.3 | 2.3 | 3.2 |
| Density (g/cm³) | 0.908 | 0.898 | 0.909 |
| ME | 1.5 | 1.6 | 1.6 |
| MT (at 50 m/min.) (g) | 1.5 | 2.1 | 1.5 |
| Properties | | | |
| Haze (%) | 3 | 4 | 4 |
| Tensile elongation at break (TD) (%) | 480 | 470 | 490 |
| Tensile strength at break (TD) (kg/cm²) | 540 | 550 | 550 |
| DDI (kg · cm) | not broken | not broken | not broken |
| Heat seal (temperature at 300 g load (τ) | 104 | 88 | 104 |
| Static wearing coefficient | 0.15 | 0.25 | 0.11 |
| Blocking (g/10 cm²) | 120 | 250 | 80 |
| ΔMFR | 0 | 0 | 0 |
| Shade (Yellow index) | 2.5 | 2.5 | 2.4 |

Note:
*1: High-pressure low-density polyethylene
*2: Octadecyl 3-(3,5-di-tert.-butyl-4-hydroxyphenyl)propionate
*3: Tetrakis-(2,4-di-tert.-butylphenyl)-4,4'-biphenylene-di-phosphonite
*4: Amorphous aluminosilicate
*5: Behenic acid amide
*6: Erucinic acid amide
*7: Ethylenebisoleic acid amide Referring to Table 1, when Example 1 of the present invention is compared with Comparative Example 5, it is seen that the former has far more superior heat sealability and low-temperature resistance, as well as properties with respect to food sanitation (i.e., a smaller amount of heptane-solubles), than Example 5. Furthermore, when Example 4 of the present invention and Comparative Example 5 are compared with each other, it is seen that, although these examples are compositions having the same density, the former has far more superior properties than the latter with respect to heat resistance and food sanitation.

As has been described above, a resin composition for extruded forms according to the present invention has improved workability and far more superior transparency, heat resistance, low-temperature resistance, etc. than those of conventional LLDPE. Since the resin composition according to the present invention has an excellently-balanced anti-blocking property, and has far more superior film properties than conventional forming material with respect to impact strength, heat sealability, heat resistance, low-temperature resistance, etc., the resin composition can be very advantageously used to form wrapping/packaging and filling materials. Such wrapping/packaging and filling materials may be used for foods such as dry foods (e.g., snacks or instant noodles), water-containing foods (e.g., miso, pickles and soups) and frozen foods, or for pharmaceutical products.

What is claimed is:

1. A resin composition for extruded forms, said resin composition containing 75 to 99% by weight of component A and 1 to 25% by weight of component B,
   said component A comprising a copolymer of ethylene and an α-olefin having a carbon atom number of 4 to 12, said component A having the following properties (a) to (e):
   (a) a melt flow rate (MFR) of 0.7 to 3.5 g/10 min.;
   (b) a density D of 0.90 to 0.915 g/cm³;
   (c) a single peak of elution volume indicated by an elution curve obtained by temperature rising elution fractionation (TREF),
       said peak corresponding to a temperature within a range of from 40 to 70° C., and
       said elution curve satisfying a relationship in which the ratio H/W ranges from 1 to 15 when H represents the height of said peak and W represents the width of said elution curve at half of said height H;
   (d) an elution volume Y (in % of the weight thereof with respect to the total weight of said component A) at an elution temperature of 50° C. in temperature rising elution fractionation, said elution volume Y satisfying the following conditions ① or ②:
       ① Y≦−4500D+4238 when the density D of said component A is less than 0.91 g/cm³, but Y≦100; or
       ② Y≦7 when the density D of said component A is not less than 0.91 g/cm³; and
   (e) a Q value of not more than 4,
   said component B comprising a free radical polymerized, high pressure low density polyethylene,
   said component B having the following properties (a') to (e'):
   (a') a melt flow rate of 1.0 to 5 g/10 min.;
   (b') a density of 0.919 to 0.923 g/cm³;
   (c') a memory effect (ME) of not less than 2.3;
   (d') a melt tension (MT) of not less than 5 g; and
   (e') a Q value of from 5 to 30,
   said resin composition further containing component C, component D and component E,
   said component C comprising a phenol antioxidant and a phosphorus antioxidant which are contained in an amount of 0.01 to 1 part by weight, in total, per 100 parts by weight of the total amount of said component A and said component B, wherein said phenol antioxidant and said phosphorus antioxidant are present in a weight ratio of from 80:20 to 20:80,
   said component D comprising an anti-blocking agent which is contained in an amount of 0.01 to 1 part by weight per 100 parts by weight of the total amount of said component A and said component B, and
   said component E comprising a slip agent of saturated and/or unsaturated-fatty-acid amide which is contained in an amount of 0.01 to 1 part by weight per 100 parts by weight of the total amount of said component A and said component B,
   wherein component B has a memory effect ME and a melt tension MT satisfying the following interrelationship:

ME≧(0.05×MT+1.3)/g.

2. A resin composition for extruded forms, said resin composition containing 75 to 99% by weight of component A and 1 to 25% by weight of component B,
   said component A comprising an LLDPE copolymer of ethylene and α-olefin having a carbon number of 4 to 18, said component A having the following properties (a) to (d):
   (a) a melt flow rate (MFR) of 0.3 to 4 g/10 min.;
   (b) a density D of 0.89 to 0.92 g/cm³;
   (c) an elution curve obtained by temperature rising elution fractionation (TREF), as measured from the start of elution of non-crystalline components of the relevant polymer to the completion of elution of the branchless straight chain portions of the relevant polymer, said curve having a single peak of elution volume, said single peak being the highest point of said curve as measured from start to completion and corresponding to a temperature on said curve within a range of from 35 to 85° C., said elution curve satisfying a relationship in which the ratio H/W is not less than 1 when H represents the height of said peak and W represents the width of said elution curve at half of said height H;

(d) an elution volume Y (in % of the weight thereof with respect to the total weight of said component A) at an elution temperature of 50° C. in temperature rising elution fractionation, said elution volume Y satisfying the following condition ① or ②:
① Y≦−4500D+4238 when the density D of said component A is less than 0.91 g/cm$^3$, with the provision that Y≦100; or
② Y≦10 when the density D of said component A is not less than 0.91 g/cm$^3$, said component B comprising a free radical polymerized high pressure low density polyethylene, said component B having the following properties (a') to (d'):
(a') a melt flow rate of 0.5 to 10 g/10 min.;
(b') a density of 0.915 to 0.93 g/cm$^3$;
(c') a memory effect (ME) of not less than 1.8; and
(d') a melt tension (MT) of not less than 2.5 g, said resin composition further containing component C, component D and component E, said component C comprising a phenol antioxidant and a phosphorus antioxidant which are contained in an amount of 0.01 to 1 part by weight, in total, per 100 parts by weight of the total amount of said component A and said component B, wherein said phenol antioxidant and said phosphorus antioxidant are present in a weight ratio of from 80:20 to 20:80, said component D comprising an anti-blocking agent which is contained in an amount of 0.01 to 1 part by weight per 100 parts by weight of the total amount of said component A and said component B, and said component E comprising a slip agent of saturated and/or unsaturated-fatty-acid amide which is contained in an amount of 0.01 to 1 part by weight per 100 parts by weight of the total amount of said component A and said component B, wherein component B has a memory effect ME and a melt tension MT satisfying the following interrelationship:

ME≧(0.05×MT+1.3)/g.

3. A resin composition for extruded forms, said resin composition containing 75 to 99% by weight of component A and 1 to 25% by weight of component B, said component A comprising an LLDPE copolymer of ethylene and α-olefin having a carbon number of 4 to 12, said component having the following properties (a) to (d):
(a) a melt flow rate (MFR) of 0.7 to 3.5 g/10 min.;
(b) a density D of 0.90 to 0.915 g/cm$^3$;
(c) an elution curve obtained by temperature rising elution fractionation (TREF), as measured from the start of elution of non-crystalline components of the relevant polymer to the completion of elution of the branchless straight chain portions of the relevant polymer, said curve having a single peak of elution volume, said single peak being the highest point of said curve as measured from start to completion and corresponding to a temperature on said curve within a range of from 35 to 85° C., said elution curve satisfying a relationship in which the ratio H/W is not less than 1 when H represents the height of said peak and W represents the width of said elution curve at half of said height H;

(d) an elution volume Y (in % of the weight thereof with respect to the total weight of said component A) at an elution temperature of 50° C. in temperature rising elution fractionation, said elution volume Y satisfying the following condition ① or ②:
① Y≦−4500D+4238 when the density D of said component A is less than 0.91 g/cm$^3$, with the provision that Y≦100; or
② Y≦7 when the density D of said component A is not less than 0.91 g/cm$^3$, said component B comprising a free radical polymerized high pressure low density polyethylene, said component B having the following properties (a') to (d'):
(a') a melt flow rate of 1.0 to 5 g/10 min.;
(b') a density of 0.919 to 0.923 g/cm$^3$;
(c') a memory effect (ME) of not less than 2.3; and
(d') a melt tension (MT) of not less than 5 g, said resin composition further containing component C, component D and component E, said component C comprising a phenol antioxidant and a phosphorus antioxidant which are contained in an amount of 0.01 to 1 part by weight, in total, per 100 parts by weight of the total amount of said component A and said component B, wherein said phenol antioxidant and said phosphorus antioxidant are present in a weight ratio of from 80:20 to 20:80, said component D comprising an anti-blocking agent which is contained in an amount of 0.01 to 1 part by weight per 100 parts by weight of the total amount of said component A and said component B, and said component E comprising a slip agent of saturated and/or unsaturated-fatty-acid amide which is contained in an amount of 0.01 to 1 part by weight per 100 parts by weight of the total amount of said component A and said component B, wherein component B has a memory effect ME and a melt tension MT satisfying the following interrelationship:

ME≧(0.05×MT+1.3)/g.

4. A resin composition for extruded forms, said resin composition containing 50 to 99% by weight of component A and 1 to 50% by weight of component B, said component A comprising an LLDPE copolymer of ethylene and α-olefin having a carbon number of 4 to 40, said component a having the following properties (a) to (d):
(a) a melt flow rate (MFR) of 0.1 to 5 g/10 min.;
(b) a density D of 0.88 to 0.925 g/cm$^3$;
(c) an elution curve obtained by temperature rising elution fractionation (TREF), as measured from the start of elution of non-crystalline components of the relevant polymer to the completion of elution of the branchless straight chain portions of the relevant polymer, said curve having a single peak of elution volume, said single peak being the highest point of said curve as measured from start to completion and corresponding to a temperature on said curve within a range of from 35 to 85° C., said elution curve satisfying a relationship in which the ratio H/W is not less than 1 when H represents the height of said peak and W represents the width of said elution curve at half of said height H;
(d) an elution volume Y (in % of the weight thereof with respect to the total weight of said component A) at an elution temperature of 50° C. in temperature rising elution fractionation, said elution volume Y satisfying the following condition ① or ②:
① $Y \leq -4500D+4105$ when the density D of said component A is less than 0.91 g/cm³, with the provision that $Y \leq 100$; or
② $Y \leq 10$ when the density D of said component A is not less than 0.91 g/cm³, said component B comprising a free radical polymerized high pressure low density polyethylene, said component B having the following properties (a') to (d'):
(a') a melt flow rate of 0.1 to 10 g/10 min.;
(b') a density of 0.88 to 0.93 g/cm³;
(c') a memory effect (ME) of not less than 1.6; and
(d') a melt tension (MT) of not less than 1.0 g,
said resin composition further containing component C, component D and component E,
said component C comprising a phenol antioxidant and a phosphorus antioxidant which are contained in an amount of 0.01 to 1 part by weight, in total, per 100 parts by weight of the total amount of said component A and said component B, wherein said phenol antioxidant and said phosphorus antioxidant are present in a weight ratio of from 80:20 to 20:80,
said component D comprising an anti-blocking agent which is contained in an amount of 0.01 to 1 part by weight per 100 parts by weight of the total amount of said component A and said component B, and
said component E comprising a slip agent of saturated and/or unsaturated-fatty-acid amide which is contained in an amount of 0.01 to 1 part by weight per 100 parts by weight of the total amount of said component A and said component B,
wherein component B has a memory effect ME and a melt tension MT satisfying the following interrelationship:

$ME \geq (0.05 \times MT+1.3)$/g.

5. A resin composition according to claim 4 wherein said component A is contained in an amount of 75 to 99% by weight, and said component B is contained in an amount of 1 to 25% by weight.

6. A resin composition according to claim 4 wherein said component A is contained in an amount of 80 to 97% by weight, and said component B is contained in an amount of 3 to 20% by weight.

7. A resin composition according to claim 4 wherein said component A is contained in an amount of 85 to 95% by weight, and said component B is contained in an amount of 5 to 15% by weight.

8. A resin composition according to claim 4 wherein said component A has a melt flow rate of 0.3 to 4 g/10 min.

9. A resin composition according to claim 4 wherein said component A has a melt flow rate of 0.7 to 3.5 g/10 min.

10. A resin composition according to claim 4 wherein said component A has a density of 0.89 to 0.92 g/cm³.

11. A resin composition according to claim 4 wherein said component A has a density of 0.90 to 0.915 g/cm³.

12. A resin composition according to claim 4 wherein said component A has a single peak of elution volume indicated by an elution curve obtained by temperature rising elution fractionation, which peak corresponds to a temperature within a range of from 40 to 70° C.

13. A resin composition according to claim 4 wherein said component B has a memory effect of not less than 1.8.

14. A resin composition according to claim 4 wherein said component B has a memory effect of not less than 2.0.

15. A resin composition according to claim 4 wherein said component B has a memory effect of not less than 2.3.

16. A resin composition according to claim 4 wherein said component B has a memory effect ME and a melt tension MT satisfying the following interrelationship:

$ME \geq [0.05 \times MT+1.5]$/g.

17. A resin composition according to claim 4 having the following properties (a") to (d"):
(a") a melt flow rate of 0.5 to 10 g/ 10 min.;
(b") a density of 0.88 to 0.925 g/cm³;
(c") a memory effect of 1.0 to 2.0; and
(d") a melt tension of 0.3 to 10 g.

18. A resin composition according to claim 4 having a memory effect ME and a melt tension MT satisfying the following interrelationship:

$ME \geq [0.08 \times MT+1]$/g.

19. A resin composition for extruded forms as set forth in claim 4 wherein said ethylene-containing polymer of component B has a Q value of from 7 to 25.

20. A resin composition for extruded forms as set forth in claim 4 wherein said ethylene-containing polymer of component B has a Q value of from 10 to 20.

21. A resin composition according to claim 4 wherein said component A further has a Q value of not more than 4.

* * * * *